May 12, 1936.  W. H. FISCHER  2,040,369
ELECTRICAL APPLIANCE
Filed June 12, 1935    3 Sheets-Sheet 1
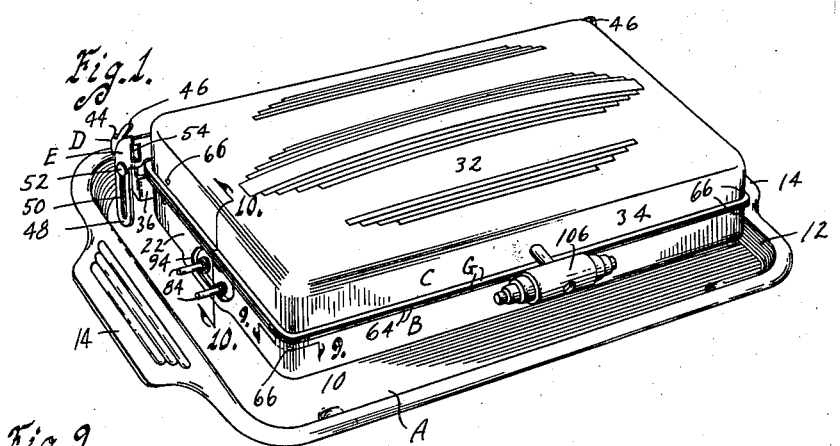
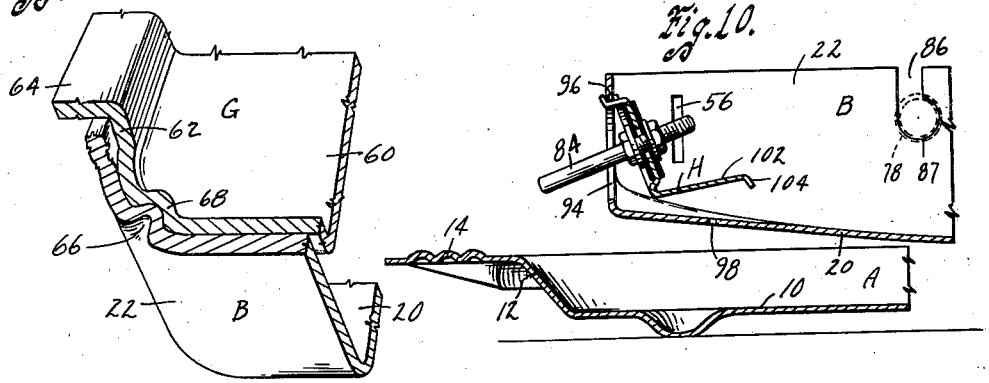
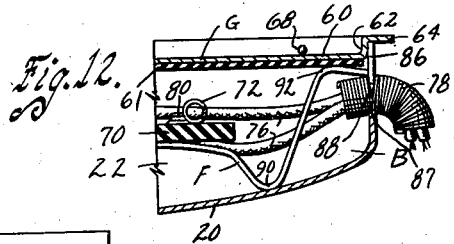
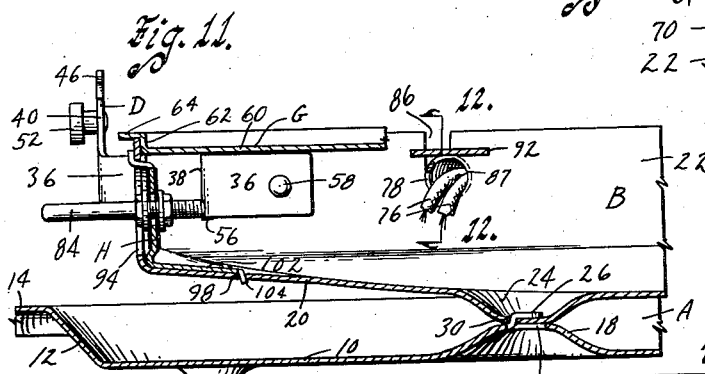

May 12, 1936.  W. H. FISCHER  2,040,369
ELECTRICAL APPLIANCE
Filed June 12, 1935  3 Sheets-Sheet 2
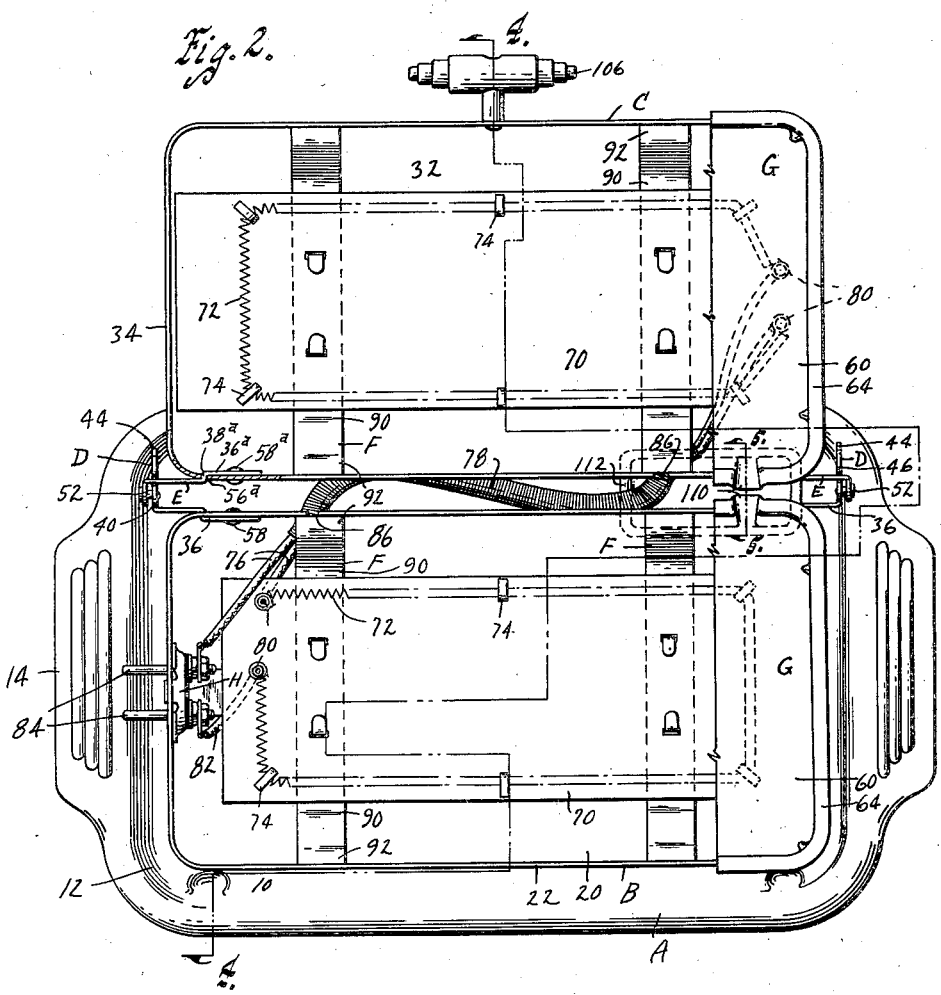
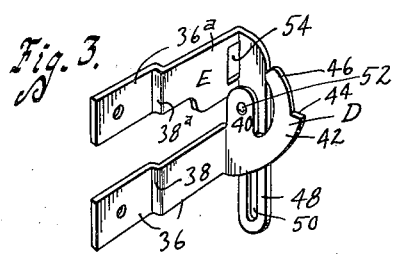

May 12, 1936. W. H. FISCHER 2,040,369
ELECTRICAL APPLIANCE
Filed June 12, 1935 3 Sheets-Sheet 3
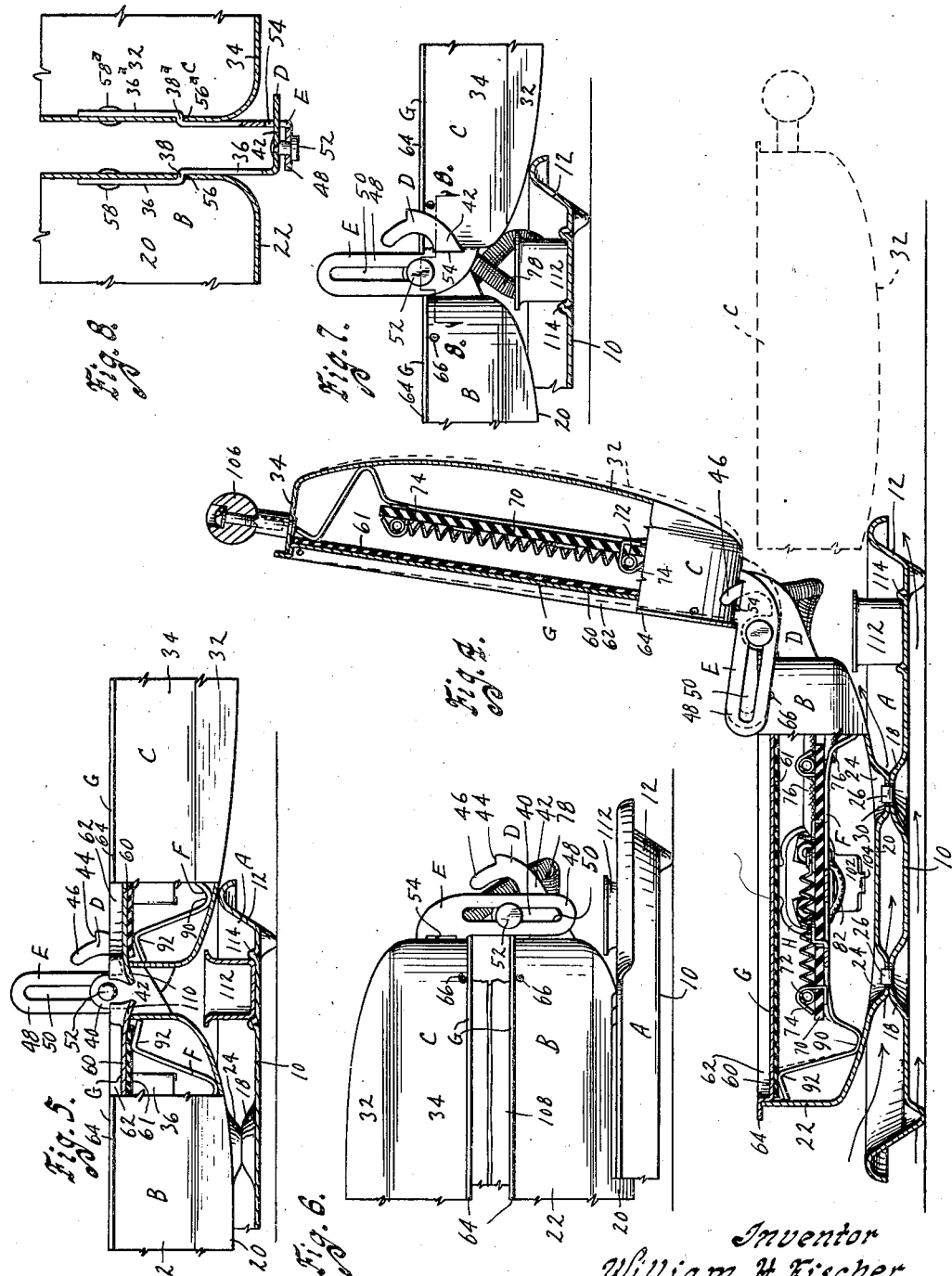

Patented May 12, 1936

2,040,369

UNITED STATES PATENT OFFICE 2,040,369

ELECTRICAL APPLIANCE

William H. Fischer, St. Louis, Mo., assignor to Knapp-Monarch Company, St. Louis, Mo., a corporation of Missouri Application June 12, 1935, Serial No. 26,188

22 Claims. (Cl. 53—5)

The object of my invention is to provide an electrical appliance, which is simple, durable and comparatively inexpensive to manufacture.

A further object is to provide an electrical appliance especially adapted for toasting sandwiches and for grill purposes, which is designed for low mounting of the appliance proper relative to a supporting surface, such as a table top without an objectionable amount of heat from the appliance affecting the table top.

Still a further object is to provide a low mounted appliance having a support in the form of a tray, provided with formed feet and upwardly depressed portions, which coact with downwardly depressed portions of an electrically heated casing, the feet serving to space the tray-like support from the table surface, and the upwardly and downwardly projecting depressions contacting with each other and being connected at their contacting points, whereby air circulation is provided beneath the tray-like support and between the tray-like support and the electrically heated casing in such manner as to minimize heat transmission from the electrically heated casing to the table top.

A further object is to provide an appliance consisting of a two-part casing, the two parts being hinged together by a novel type of hinge, which permits the two parts to be opened merely for the purpose of inserting an article of food between them or open to a position where one part forms an extension of the other, so that two different articles of food may each be heated on one side.

Another object is to provide a novel heating element assembly positionable within the two parts of the casing, the assembly being designed to facilitate manufacturing and assembling at the factory.

A further object is to provide a grid plate which can be permanently secured in a casing member and to provide a novel type of heating element retained by such securement.

Another object is to provide a terminal structure for the terminal pins of the heating element, which can be assembled in a minimum time relative to the appliance.

Still another object is to provide the heating elements supported against rattling without, however, providing any connecting means for them other than their being retained between the appliance casing and the grid element therefor when the grid element is inserted in position.

Still another object is to provide a receptacle for catching drippings from the grids, the receptacle and grids being so arranged and associated that the drippings will drop into the receptacle regardless of the position of the movable casing member relative to the stationary one.

With these and other objects in view, my invention consists in the construction, arrangement and combination of the various parts of my electrical appliance, whereby the objects contemplated are attained, as hereinafter more fully set forth, pointed out in my claims, and illustrated in the accompanying drawings, in which:

Figure 1 is a perspective view of an electrical appliance embodying my invention.

Figure 2 is a plan view of the same, showing it open with parts of the grids broken away to illustrate internal construction.

Figure 3 is a perspective view of a hinge structure used in connection with my appliance.

Figure 4 is a sectional view on the line 4—4 of Figure 2.

Figure 5 is a sectional view on the line 5—5 of Figure 2 showing a means I have provided for catching drippings from the grids.

Figure 6 is an end elevation showing the part of the sandwich toaster adjacent the hinge, showing the appliance closed.

Figure 7 is a view similar to Figure 6 showing the appliance open.

Figure 8 is a sectional view on the line 8—8 of Figure 7, showing hinge details.

Figure 9 is an enlarged, perspective sectional view on the line 9—9 of Figure 1.

Figure 10 is a sectional view on the line 10—10 of Figure 1, showing the position of the parts during assembly.

Figure 11 is a similar view showing further details and another step in the assembly process; and Figure 12 is a sectional view on the line 12—12 of Figure 11, showing a means of extending circuit wires forming part of the appliance casing.

On the accompanying drawings, I have used the reference character A to indicate generally a tray-like support. A stationary heating element casing B is mounted thereon, and a second heating element casing C is hinged to the casing B.

The tray A comprises a relatively flat bottom part 10, having a peripheral upwardly and outwardly sloping flange 12, terminating at the ends in flange-like handle portions 14.

Portions 16 are formed in the bottom 10 by depressing the material, and these are arranged preferably adjacent the periphery of the bottom 10. Adjacent the center of the bottom, a plurality of upwardly depressed portions 18 serve as supports for the casing B, as will hereinafter appear.

The casing B comprises a slightly dished bottom 20 and a peripheral upstanding or cylindrical flange 22. The bottom 20 is provided with downwardly depressed portions 24 which contact with the upper surfaces of the depressions 18 and are secured thereto in any suitable manner.

I have shown tongues 26 pressed from openings 28 in the depressions 18 and projected through slots 30 in the depressions 24 for this purpose.

The top casing C comprises a top member 32 and a peripheral, cylindrical down-turned flange 34.

The casing parts B and C are first formed of the same shape for the purpose of economy in manufacture.

Thereafter the portions of one, which differ from the other, such as the depressions 24 of the bottom of the casing B are formed by a separate stamping operation.

The casing C is hinged to the casing B by a hinge structure comprising a pair of hinge elements D mounted on the casing B and E mounted on the casing C. Each hinge element D comprises a plate 36 having an offset portion 38, a perforated flange 40 and a stop flange 42. The stop flange is provided with a stop shoulder 44 and a guiding finger 46. The hinge element E comprises a flange 36a having an offset 38a and a flange 48. The flange 48 is provided with a slot 50 adapted to slide and pivot relative to a pivot pin 52. A slot 54 is also provided in the hinge element E to receive the finger 46 and the stop flange 42.

The hinge elements D and E have their offset portions 38 and 38a projected through slots 56 and 56a in the casings B and C and then riveted as at 58 and 58a (see Figures 11 and 2).

Thus a single rivet in conjunction with the slots 56 and 56a retains each hinge element against pivotal movement relative to the casings B and C, which construction provides simplicity in manufacture and facilitates assembly.

For closing the open side of each casing B and C, I provide a grid G. Each grid comprises a plane-like plate 60 and a peripheral, cylindrical flange 62, which terminates in an outwardly directed flange 64.

The flanges 62 are adapted to fit the interior of the casings B and C, while the flanges 64 limit inward movement of the grids relative to the casings during assembly.

After the parts are thus assembled, they are retained against subsequent disassembly by means of indentations 66 (see Figure 9) pressed into the flanges 22 and 34 of the casings B and C and causing indentations 68 to be formed in the flanges 62 of the grids G.

I provide heating means for the casings B and C in the form of an assembly consisting of two insulating plates 70, a heating element 72 secured to each one, as by metallic clips 74 and conductors 76 (see Figure 2) extending from one heating element 72 to the other. The conductors 76 are enclosed in a protecting cover, such as a coil spring 78.

The heating elements 72 have terminal rivets 80 with which the ends thereof are connected, three ends of two wires 76 being connected with three of these rivets and one end of a wire 82 being connected with the fourth one, the fourth end of the two wires 76 and the other end of the wire 82 being connected with terminal pins 84.

For permitting hinging of the casing C relative to the casing B without kinking and eventually breaking the wires 76, the protector spring 78 is provided, and it extends into the casings B and C adjacent the hinge axis. These casings are provided with notch-like openings 86 for this purpose. (See Figures 10, 11 and 12.) The wires 76 are received in these openings with the end of the coil spring 78 slightly spread as indicated at 88 to position the spring longitudinally relative to the casing wall in which the opening 86 is formed. This prevents the spring from being pulled out and the spring during the hinging movement causes the wires 76 to always assume gradual rather than any sharp bends.

The opening 86 has a bottom part 87 which is enlarged and offset as clearly shown in Figure 10. It is offset in a direction toward the center of the casing as the spring 78 and the wires 76 bend toward that direction.

The spring is slightly larger in diameter than the portion 87 of the opening 86, as shown by dotted lines, so that when once in position, the diameter of the spring will not permit its inner end to be pulled through the opening 87.

By forming the opening 86 in this shape with the widened part 87 lying toward the direction in which the strain comes on the spring 78 and the wires 76, the spring is effectively held against disassociation with respect to the casing, even without being engaged by a portion 92 of a strap F as described in the following paragraph.

The insulating plates 70 are properly spaced between the grids G and the backs 20 and 32 of the casings B and C by strap-like supporting elements F. These are preferably formed of resilient metal, having oppositely displaced portions 90 and 92. The portions 90 engage the backs of the casings, while the portions 92 engage the grids, (sheets of insulation 61 being interposed between them), when the grids are in assembled position.

The dotted line showing at the left side of Figure 4 illustrates the ends of the elements F in their original position, out of which they are sprung by assembling in the appliance, thus placing the parts under tension, so that the insulating plates 70 are properly spaced relative to the grids G and held against any rattling or displacement.

The notches 86 for the protector spring 78 are each formed adjacent one of the displaced portions 92 of the member F as shown in Figure 12. This portion accordingly retains the spring in the notch after the heating element assembly is placed in the casings and before the grid plates are assembled in position.

The terminal pins 84 are supported on and insulated from a terminal clip H, which is of novel construction. It is adapted in its assembled position to close an opening 94 in the casing B, through which the terminal pins project. A notch 96 is provided in one side of the opening 94 and the casing is provided with a slot-like opening 98 spaced from the notch. The clip H has a positioning ear adapted to position the clip by entering the notch 96, and also has a resilient finger 102 having a terminal end 104 to snap into the slot 98.

The parts during assembly assume the position shown in Figure 10, after which they are swung clock-wise until the vertical portion of the clip H in which the terminal pins are mounted contacts with the flange 22 of the casing B, whereupon the terminal end 104 snaps into the slot 98 with the finger 102 under tension, tending to permanently retain the terminal structure in this assembled position.

I have provided means for catching drippings from the grids G, comprising a lip 110 formed on each grid adjacent the hinge axis (see Figures 2 and 5). These constitute discharge troughs through which grease or other drippings may drip into a receptacle 112. The receptacle is removable relative to the tray-like support A, the support being provided with a flange or bead 114 to position the receptacle beneath the lips 110. Regardless of whether the casing C is in partially opened or fully opened position, the drippings from its lip 110 will be caught in the receptacle 112. The receptacle being removable facilitates discharge of its accumulated contents when desired.

*Practical operation*

In the operation of my appliance, the upper casing C may be swung to an open position, a handle 106 being provided for convenience during this operation. The upper edge of the slot 54 in Figure 3 will engage the stop shoulder 44 when the parts assume the full line position of Figure 4. This serves to retain the appliance open, while placing a sandwich 108 or the like therein, after which the casing member C may be swung to closed position as shown in Figure 6.

The slotted connection consisting of the pivot pin 52 and the slot 50 permits the casing members B and C to be spaced to accommodate the thickness of the sandwich or slices of meat or other food products to be cooked in the appliance.

After the position of Figure 4 is assumed by slightly lifting on the handle 106, gravity, due to the slight inclination of the casing C in the full line position of Figure 4 will cause the casing C to slide to the dotted position with the slots 54 disengaging the stop shoulders 44.

Thereafter the casing member C may be swung to the dotted position of Figure 4 with the widened portion 42a of the flange 42 serving as a stop by preventing further pivotal movement of the slot 54, after the casing member C has assumed the dotted position. In this position, the casing member C and its grid G are in a level position, so that each grid surface may be used as a cooking surface.

Some changes may be made in the construction and arrangement of the various parts of my electrical appliance without departing from the real spirit and purpose of my invention, and it is my intention to cover by my claims, any modified forms of structure or use of mechanical equivalents, which may be readily included within their scope.

I claim as my invention:

1. In an electrical appliance, a substantially flat, tray-like support having a plurality of spaced apart upstanding, relatively small diameter portions of substantial height projecting from the plane thereof and serving as a support, a two-part casing, the parts thereof being hingedly connected together, electric heating elements contained in each of the two parts of said casing, the bottom part of said casing resting on said upstanding portions of said tray-like support, and being connected at the points where the bottom casing part rests upon said tray-like support for providing a substantial space for atmospheric air circulation between the major part of said bottom and the top of said tray-like support including the space among said spaced apart upstanding portions.

2. In a low mounted type of electrical appliance, a tray-like support, spaced feet for supporting said tray-like support relative to a supporting surface and a plurality of spaced apart upstanding portions formed on said tray and serving as supports, a casing, an electric heater therefor, the bottom part of said casing resting on said upstanding portions of said tray-like support and slot and tongue inter-connections at the points where said bottom of said casing rests on said tray-like support for providing a substantial space for atmospheric air circulation between the major part of said bottom and the top of said tray-like support including the space among said portions.

3. In an electrical appliance, a substantially flat, tray-like supporting member having open top, depending depressions formed therein to serve as supporting feet exposed on their upper surfaces to atmospheric air circulation, an electrically heated casing member, and means for spacing the two members relative to each other and supporting the casing member on the tray-like supporting member, comprising a plurality of laterally spaced apart outstanding portions of substantial height formed on at least one of said members and projecting from the plane thereof and contacting with the other one, and means of connection at the point of contact.

4. In a low mounted type of electrical appliance, a supporting plate, projections on the under surface thereof for spacing said plate above a table top or the like, said projections being positioned adjacent the periphery of said supporting plate and forming depressions in the upper surface of said plate, said depressions being open to atmospheric air circulation, an electrically heated casing including a bottom plate, and means for mounting said casing on and adjacent said supporting plate, comprising a plurality of spaced apart outwardly displaced portions of substantial height on at least one of said plates, projecting from the plane thereof and located adjacent the center of said supporting plate, and means for rigidly connecting the other plate thereto at said displaced portions and thereby providing an air space among said portions.

5. In an appliance, a supporting plate, projections on the under surface thereof for spacing said plate above a table top or the like, said projections forming depressions in the top surface of said plate, said depressions being open to atmospheric air circulation, a heated casing including a plate and means for mounting said casing in direct connection with and adjacent said supporting plate comprising outwardly displaced portions of substantial height on at least one of said plates, and means for connecting the other plate thereto at said displaced portions.

6. In an appliance, a supporting plate, a heated casing including a bottom plate, means for mounting said casing on and adjacent said supporting plate comprising a plurality of outwardly displaced portions on at least one of said plates, said portions being laterally spaced apart and of substantial height and slot and tongue connections between the other plate and each of said outwardly displaced portions.

7. In an electrical appliance, a pan-shaped casing member, a shallow pan-like grid member closing the open side of said casing member, heating means within said casing member and enclosed by said grid member, and means to retain said grid member assembled relative to said casing member comprising a cylindrical flange on said grid member fitting the interior of said casing member, and a plurality of indentations spaced apart along and in said casing member and cylindrical flange preventing removal of the grid member relative to the casing member.

8. In an electrical appliance, a pair of similar pan-shaped casing members hinged together, a shallow pan-like grid member closing the open side of each casing member, heating means within said casing members and enclosed by said grid members, and means to retain said grid members assembled relative to said casing members, comprising a cylindrical flange on each grid member fitting the interior of said casing member, and a plurality of indentations in and spaced apart along said casing member and cylindrical flange preventing removal of the grid member relative to the casing member, the periphery of said grid member having an outwardly projecting flange to limit movement thereof inwardly relative to said casing member during assembly.

9. In an appliance of the character disclosed, a pair of casing members hinged together and each including a pan-shaped grid, means for collecting drippings from said grids, comprising a discharge lip in each grid, and a receptacle beneath said lips, said lips being adjacent the hinge axis, whereby the drippings therefrom enter said receptacle whether said casing members are in open or closed position.

10. In an appliance of the character disclosed, a pair of casing members hinged together and each including a pan-shaped grid, means for collecting drippings from said grids, comprising a discharge lip in each grid, and a receptacle beneath said lips, said lips being adjacent the hinge axis, whereby the drippings therefrom enter said receptacle whether said casing members are in open or closed position, a tray for supporting said casing members, and positioning means on said tray for said receptacle, said receptacle being removable therefrom for the purpose of discharging drippings therefrom.

11. In an electrical appliance, a plate-like supporting element, a casing element, an electrical heater therefor, one of said elements having a plurality of laterally spaced portions projecting from the plane thereof and toward and engaging the other element for supporting purposes, means of connection between said elements at the points of contact therebetween, said portions providing a space between the major part of said elements for circulation of atmospheric air including the space among said portions.

12. A support for a relatively low electrical appliance comprising a single sheet of material in the form of a tray having depressed portions adjacent the periphery thereof serving as feet and means spaced inwardly from said periphery formed of said sheet material and projecting upwardly from the plane thereof to which the relatively low electrical appliance is rigidly connected and being hollow and open from below said sheet of material for positioning said appliance above and spaced from the tray permitting atmospheric circulation both below and within the hollow portion of said means and between the tray and the appliance.

13. In combination with a casing having an electrical heating element therein, means for supporting said casing on a table or other supporting surface to substantially prevent heat from said casing being transmitted to said table comprising a single sheet of material having a plurality of downwardly depressed, open top projections in close proximity to the periphery thereof for permitting atmospheric air circulation therewithin above said sheet of material and therearound below said sheet of material, said casing being spaced upwardly above said tray and projection means adjacent the center of the tray to support said casing rigidly relative to said tray and in such spaced position to permit atmospheric air circulation between the plane of the tray and the bottom of the casing and below said projection means.

14. In a relatively low type electrical appliance, a tray-like supporting member having hollow depressed portions formed therein to serve as supporting feet, said depressed portions being subjected to the circulation of air both above and below said tray-like supporting member, an electrically heated casing member and means for spacing the two members relative to each other comprising an upstanding portion formed on said tray-like supporting member and upon which said casing is positioned and means of connection between said casing member and tray-like supporting member.

15. A support for a low mounted electrically heated appliance comprising a single sheet of material permanently fastened to and forming a unitary part of said appliance, said sheet of material being bent and shaped to provide a relatively flat, tray-like element, feet for supporting it on and above a table surface and to support the appliance above the plane of the material to permit air circulation on both sides of said sheet of material to dissipate heat by conduction from the heated appliance through said material.

16. A support for a low mounted electrically heated appliance comprising a single sheet of material permanently fastened to and forming a unitary part of said appliance, said sheet of material being bent and shaped to provide a relatively flat, tray-like element, feet for supporting it on and above a table surface and to support the appliance above the plane of the material to permit air circulation on both sides of said sheet of material to dissipate heat by conduction from the heated appliance through said material, the point of heat transfer from the appliance to said support being remote from the feet.

17. In an appliance of the character disclosed, a support, a casing member hinged thereto and including a pan shaped grid, means for collecting drippings from said grid comprising a discharge lip in said grid and a receptacle beneath said lip, said lip being adjacent the hinge axis whereby the drippings therefrom enter said receptacle in any position assumed thereby relative to said support.

18. In an appliance of the character disclosed, a support, a casing member hinged thereto and including a pan shaped grid, means for collecting drippings from said grid comprising a discharge lip in said grid, a receptacle beneath said lip, said lip being adjacent the hinge axis whereby the drippings therefrom enter said receptacle in any position assumed thereby relative to said support, and positioning means on said support for said receptacle, said receptacle being removable therefrom for the purpose of discharging drippings therefrom.

19. In a low-mounted type electrical appliance, a supporting plate, means adjacent the periphery thereof for supporting said plate relative to a supporting surface and a plurality of laterally spaced apart up-struck portions formed on the top of said plate adjacent the center thereof and serving as supports, a casing, an electric heater therefor, the bottom of said casing having a plurality of spaced apart down-struck portions alined with and resting on said up-struck portions of said supporting plate for providing space for atmospheric air circulation between the major part of said bottom and the top of said plate including the space among said portions and also below said plate and between those portions on the plate and the supporting surface for the plate and means connecting said plate and casing together to provide a unitary structure.

20. In a low-mounted type electrical appliance, a supporting plate, a peripheral flange on said plate, means adjacent said flange for supporting said plate relative to a supporting surface, a casing, an electric heater therefor, the bottom of said casing comprising a plate and a plurality of laterally spaced apart out-struck portions on one of said plates serving as supports for supporting said casing and providing a space between the major portions of said plates for atmospheric air circulation including the space among said portions and means for connecting said plates together to provide a unitary structure.

21. Supporting means for a low-mounted type electrical appliance comprising a single plate of material having a peripheral flange, means adjacent said flange for supporting said plate spaced above a supporting surface, a plurality of laterally spaced apart upwardly pressed portions formed on the top of said plate adjacent the center thereof and serving as supports for an electrical appliance casing or the like and providing space for atmospheric air circulation between the major part of said plate and a casing when supported thereon, including the space among said portions and also below said supporting plate between said portions and the supporting surface for the plate, and means for connecting said plate with an electrical appliance casing to provide a unitary structure.

22. In an electrical appliance, a supporting plate, a casing including a bottom plate, electric heating means for said casing, means for mounting said casing on and adjacent said supporting plate comprising a plurality of outwardly displaced portions on at least one of said plates, said portions being laterally spaced apart and of substantial height, means for connecting said plates together and a terminal prong assembly mounted in the side of said casing substantially in alinement with said heating means and supported by the casing.

WILLIAM H. FISCHER.